No. 775,082. PATENTED NOV. 15, 1904.
E. P. HOWE.
RAIL BOND.
APPLICATION FILED FEB. 23, 1904.
NO MODEL.

Witnesses:
H. B. Davis.
M. M. Piper.

Inventor:
Edw. P. Howe
by Noyes & Harriman
Attys

No. 775,082.

Patented November 15, 1904.

UNITED STATES PATENT OFFICE.

EDWARD P. HOWE, OF NEWBURYPORT, MASSACHUSETTS, ASSIGNOR TO CHASE-SHAWMUT CO., OF NEWBURYPORT, MASSACHUSETTS, A CORPORATION OF MAINE.

RAIL-BOND.

SPECIFICATION forming part of Letters Patent No. 775,082, dated November 15, 1904.

Application filed February 23, 1904. Serial No. 194,721. (No model.)

*To all whom it may concern:*

Be it known that I, EDWARD P. HOWE, of Newburyport, county of Essex, State of Massachusetts, have invented an Improvement in Rail-Bonds, of which the following description, in connection with the accompanying drawings, is a specification, like characters on the drawings representing like parts.

This invention relates to rail-bonds of the type adapted to be soldered to the rails and comprising a flexible intermediate portion and a pair of flat rail-engaging feet. Heretofore a plate of solder has been attached at one end by solder to the bottom of each flat foot, and in practice a more secure method of attaching these plates is desirable, as the solder connection is easily broken in shipping and the plates lost. Furthermore, the means employed for attaching the plates to the feet should be such that the unattached portions may be bent outward for the purpose of applying the soldering fluid without liability of detaching them from the feet.

To this end my invention consists in a rail-bond having a flexible intermediate portion and a pair of flat feet and a plate of solder attached to the bottom of each flat foot by a rivet, which may be made of solder and which passes entirely through the foot, said plate of solder having an upturned lip at its outer end, which overlies the end of the foot and assists in keeping the plate in correct position until the bond is applied to the rail, and when the bond is applied to the rail the excess of solder at the end incident to the provision of said lip acts to prevent undue leakage of solder from the end of the ferrule while the heat and pressure is applied.

Figure 1:
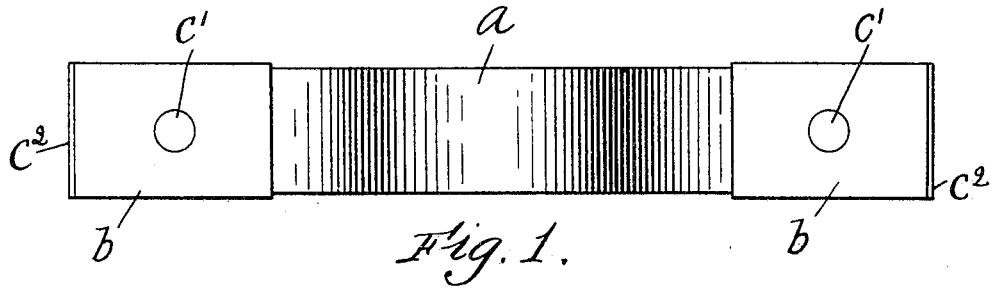
Figure 2:
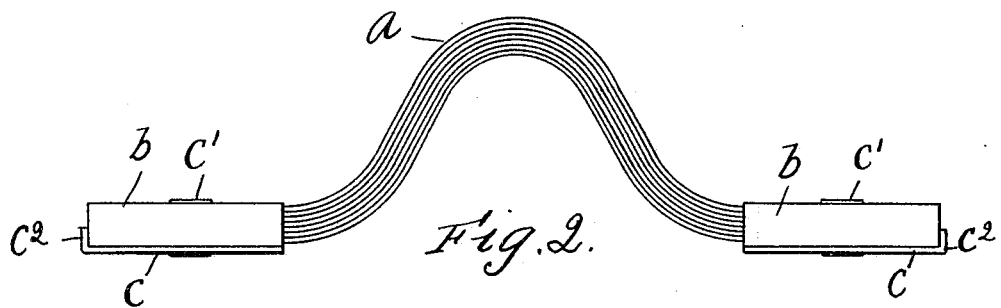
Figure 3:
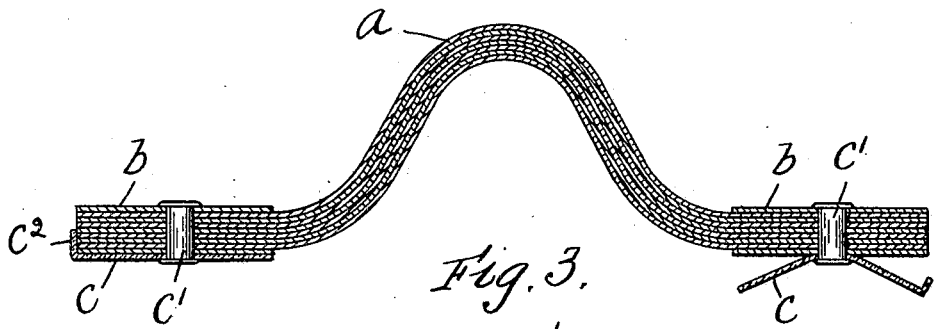
Figure 4:
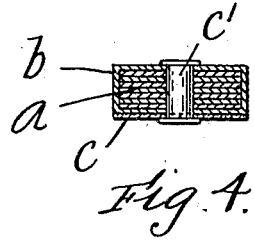

Figure 1 shows in plan view a rail-bond embodying this invention. Fig. 2 shows the rail-bond in side elevation. Fig. 3 shows the rail-bond in longitudinal vertical section and showing particularly the rivet holding the plate of solder, while the end portions thereof are turned outward for the application of a soldering fluid. Fig. 4 is a transverse section of the rail-bond, taken through one of the rail-engaging feet.

The flexible intermediate portion $a$ comprises several strips of copper, yet so far as the present invention is concerned said intermediate portion may be otherwise constructed. A ferrule $b$ incloses each end of the intermediate portion $a$ to provide the bond with flat rail-engaging feet, yet said rail-engaging feet may be otherwise constructed. The ends of the intermediate portion and the ferrule are dipped in solder, and thereby secured together.

$c$ represents a plate of solder which is attached to the bottom of each rail-engaging foot, and herein said plate of solder is attached to the foot by a rivet $c'$, which may be composed of solder and which passes entirely through the foot and plate. The plate $c$ has an upturned lip $c^2$ at its outer end, which overlies the end of the rail-engaging foot. While the bond is being shipped the upturned lip $c^2$ holds the plate $c$ from turning on the rivet, and when applying the bond said upturned lip provides an excess of solder at the end of the ferrule, which prevents undue leakage thereat when heat and pressure is applied.

To apply the soldering fluid, the end portions of the plate $c$ will be bent outward, as shown in Fig. 3, and thereafter bent back again, and the rivet holds the plate securely while this is being done.

Having thus described my invention, what I claim as new, and desire to secure by Letters Patent, is—

1. A rail-bond having a flexible intermediate portion, a pair of rail-engaging feet, a ferrule inclosing each of said feet, plates of solder attached to the bottoms of said ferrules by rivets and having upturned lips at their outer ends which overlie the ends of the feet and prevent said plates of solder from turning on the rivets, substantially as described.

2. A rail-bond having a flexible intermediate portion, a pair of rail-engaging feet, a ferrule inclosing each of said feet, plates of solder attached to the bottoms of said ferrules by fusible rivets, said plates having upturned lips at their outer ends which overlie the ends of the feet and are thereby prevented from turning on the rivets, substantially as described.

3. A rail-bond having a flexible intermediate portion, a pair of rail-engaging feet, plates of solder attached to the middle of said feet by means of solder rivets, said plates having upturned lips at their outer ends which overlie the ends of the feet, substantially as described.

In testimony whereof I have signed my name to this specification in the presence of two subscribing witnesses.

EDWARD P. HOWE.

Witnesses:
 Wm. G. Stuart,
 Ernest Foss.